United States Patent
Lee

(10) Patent No.: US 7,432,621 B2
(45) Date of Patent: Oct. 7, 2008

(54) FLUID DYNAMIC BEARING MOTOR

(75) Inventor: Ta-Kyoung Lee, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/709,287

(22) Filed: Feb. 22, 2007

(65) Prior Publication Data
US 2007/0194645 A1  Aug. 23, 2007

(30) Foreign Application Priority Data
Feb. 22, 2006  (KR) .............. 10-2006-0017189

(51) Int. Cl.
*H02K 7/08* (2006.01)
(52) U.S. Cl. .......................... 310/90; 384/107
(58) Field of Classification Search ............... 310/90, 310/67 R; 384/100, 107, 112
See application file for complete search history.

(56) References Cited

U.S. PATENT DOCUMENTS 6,900,567 B2 * 5/2005 Aiello et al. ............... 310/90
6,949,852 B2 * 9/2005 Aiello ....................... 310/90

* cited by examiner

*Primary Examiner*—Dang D Le

(57) ABSTRACT

The present invention relates to the fluid dynamic bearing motor. The fluid dynamic bearing motor having a ring-shaped housing having a coil joined to an edge thereof, a sleeve including a protruded part joined to a central part of the housing and a ring-shaped contact part formed as a single body with the protruded part, a ring-shaped hub having an inner perimeter joined to the contact part and having a magnet attached to an edge thereof, the magnet facing the coil, a stopper positioned between the housing and the contact part and joined to the hub such that the sleeve is not detached from the hub, a storing part formed as a space between the stopper and the sleeve and filled with fluid, for supplying and maintaining the fluid in a gap formed between the contact part and the inner perimeter of the hub, and a penetration hole formed from a center of the sleeve to an edge of the sleeve, the penetration hole being spatially separated from the storing part.

5 Claims, 6 Drawing Sheets

50b

FLUID DYNAMIC BEARING MOTOR

CROSS-REFERENCE TO RELATED APPLICATIONS

This application claims the benefit of Korean Patent Application No. 2006-0017189 filed with the Korean Intellectual Property Office on Feb. 22, 2006, the disclosure of which is incorporated herein by reference in its entirety.

BACKGROUND

1. Technical Field

The present invention relates to the fluid dynamic bearing motor.

2. Description of the Related Art

Generally, the motor used for a precise machinery like a hard disk driver requires not only high-speed driving force but also precision control. The motor, which has this character, has to support the force of the rotation load and the rotation axis, a fluid dynamic bearing motor is a recent trend to support the force instead of a metal bearing or a ball bearing.

The fluid dynamic bearing motor needs fluid for supporting rotary body, and the rotation axis of the fluid dynamic bearing motor must be positioned at the center of the sleeve for minimizing the frictional force.

The fluid dynamic bearing motor minimizes the frictional force by forming a thin oil film between the rotary body and fixed body, and that makes pressure to support the rotary body. In order to form the pressure for forming the oil film, it is good to form a groove of herring bone shape in the rotary body or the fixed body.

A dynamic pressure becomes high while the fluid dynamic bearing motor rotates at high speed. Therefore, in case of the low speed rotation, the possibility is high to rub between the rotary body and fixed body. Therefore, it is necessary to have the structure of generating a dynamic pressure in a low speed rotation. Moreover, wrap around and maintenance of the fluid are important to spread the dynamic pressure around the fluid dynamic bearing motor. And it need to reduce the size in correspondence to the miniaturization of an instrument.

SUMMARY

The object of the present invention is to provide the fluid dynamic bearing motor which generates the dynamic pressure supporting the rotary body in the low speed rotation, and in which the wrap around maintenance and miniaturization of the fluid are possible.

Additional aspects and advantages of the present invention will become apparent and more readily appreciated from the following description, including the appended drawings and claims, or may be learned by practice of the invention.

One aspect of the present invention provides a fluid dynamic bearing motor having a ring-shaped housing having a coil joined to an edge thereof, a sleeve including a protruded part joined to a central part of the housing and a ring-shaped contact part formed as a single body with the protruded part, a ring-shaped hub having an inner perimeter joined to the contact part and having a magnet attached to an edge thereof, the magnet facing the coil, a stopper positioned between the housing and the contact part and joined to the hub such that the sleeve is not detached from the hub, a storing part formed as a space between the stopper and the sleeve and filled with fluid, for supplying and maintaining the fluid in a gap formed between the contact part and the inner perimeter of the hub, and a penetration hole formed from a center of the sleeve to an edge of the sleeve, the penetration hole being spatially separated from the storing part.

It may be preferable that the longitudinal direction of the storing part is formed perpendicularly to a rotation axis of the hub. It may be preferable that the stopper is a circular flat board having a central part perforated. It may be preferable that a groove is formed in the inner perimeter of the hub or in the contact part. It may be preferable that a groove is formed in the inner perimeter of the hub or in the stopper in correspondence to the inner perimeter of the hub such that induces the dynamic pressure of the fluid and pumps the fluid to the direction of centrifugal force.

DETAILED DESCRIPTION

Hereinafter, an embodiment of the fluid dynamic bearing motor according to the present invention will be described in more detail with reference to the accompanying drawings.

Embodiments of the fluid dynamic bearing motor according to the invention will be described below in more detail with reference to the accompanying drawings. In the description with reference to the accompanying drawings, those components are rendered the same reference number that are the same or are in correspondence regardless of the figure number, and redundant explanations are omitted. Also, the basic principles will first be described before discussing the preferred embodiments of the invention.

Figure 1:
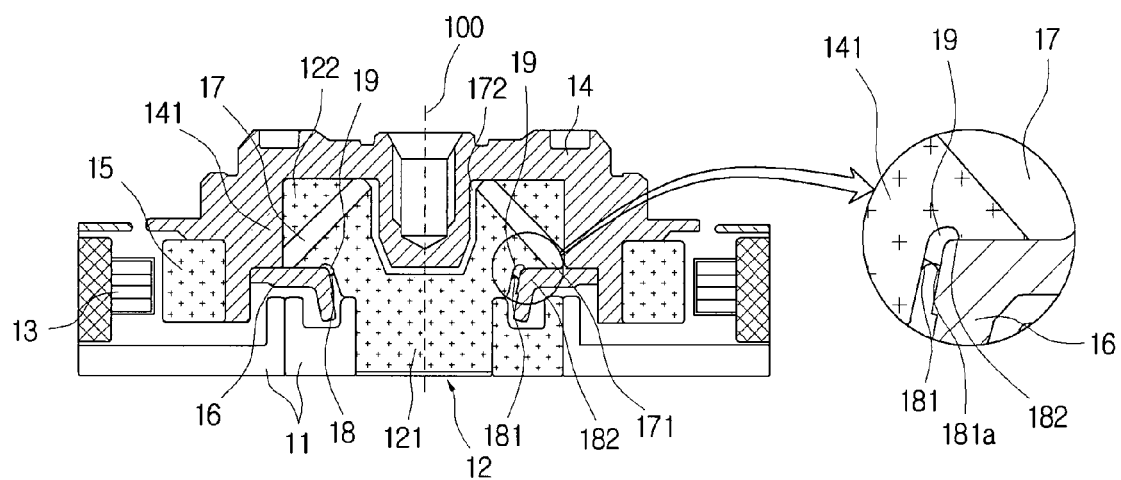
FIG. 1 is a cross-sectional view of a fluid dynamic bearing motor according to the first embodiment of the present invention.

FIG. 1 is a cross-sectional view of the fluid dynamic bearing motor according to the first embodiment. Referring to FIG. 1, housing 11, sleeve 12, protruded part 121, contact part 122, coil 13, hub 14, inner perimeter 141, magnet 15, stopper 16, penetration hole 17, storing part 18, fluid 19, rotation axis 100 are illustrated.

Ring-shaped housing 11 plays the role of fixing the sleeve 12. Coil 13 is coupled with the edge of the housing 11, and the magnetic field is formed when the electric current is applied to coil 13. This housing 11 can be coupled with different component for facilitation of manufacturing.

The central part of the housing 11 is coupled with sleeve 12. It is preferable that sleeve 12 is made of protruded part 121 and contact part 122. It is general that protruded part 121 directly jointed to housing 11 is coupled with a hole or a groove formed in housing 11. Protruded part 121 is formed with the contact part 122 as one body. Contact part 122 is the part interposing the fluid and jointing with hub inner perimeter 141. Contact part 122 is bigger than the protruded part 121, and a circular shape, and it maintains the distance from housing 11.

Hub 14 is a rotary body, and fluid 19 is injected between contact part 122 of sleeve 12 and hub inner perimeter 141. It is preferable that hub 14 is symmetrically formed around rotation axis 100. If hub 14 is deflected, vibration will be created. Magnet 15 is coupled with the edge of hub 14, and it is preferable that magnet 15 is faced with coil 13. The magnetic field of coil 13 makes mutual repulsion with the one of magnet 15 so that hub 14 smoothly rotates. Magnet 15 is arranged at the inner side comparing with coil 13 around rotary shaft 100 as shown in FIG. 1. But coil 13 may be positioned at the inner side comparing with magnet 15.

Stopper 16 is positioned between housing 11 and contact part 122. Stopper 16 is coupled with inner perimeter 141 of hub 14. Stopper 16 serves as a fixing element preventing that hub 14 leaves away from sleeve 12. In the meantime, a space is formed between stopper 16 and sleeve 12, fluid 19 is filled in the space. This space is storing part 18. It is necessary that storing part 18 must have not only a space filling fluid but also more available space not to leave the fluid to outside. That is, as shown in the enlarged view of FIG. 1, fluid interface 181a perpendicularly faces with the gravity direction at normal times. But fluid interface 181a is inclined to the stopper 16 while rotating by centrifugal force. Therefore, as shown in FIG. 1, the stopper 16 is protruded to the direction of housing 11. Moreover, it is preferable that storing part 18 which is near the housing 11 is declined to the direction of rotation axis 100, This prevent flowing out fluid 19 as a result of centrifugal force generated while rotating of hub 14.

Penetration hole 17 is formed inside of contact part 122 of sleeve 12. Hole entry 172 of penetration hole 17 is formed near rotation axis 100, and hole exit 171 of penetration hole 17 is formed to the direction of the edge of contact part 122. Particularly, it is preferable that hole exit 171 is formed in order not to be spatially connected to fluid inlet 182 of storing part 18. This is the reason that the inside of penetration hole 17 do not form same dynamic pressure comparing with fluid inlet 182 by oil film. Hole entry 172 can be formed at the various location. In FIG. 1, penetration hole 17 is formed with the oblique direction. But penetration holes 17 can be formed various angle depending on the location of hole exit 172 and hole entry 172.

Figure 2:
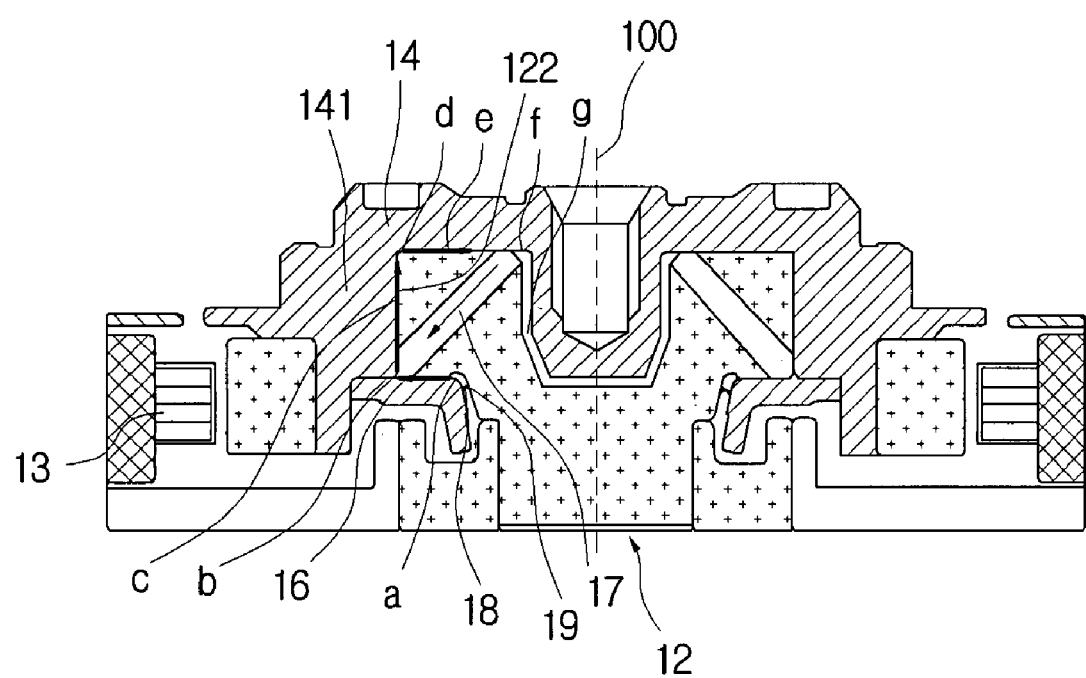
FIG. 2 is a cross-sectional view showing the flow of a fluid of the fluid dynamic bearing motor according to the first embodiment of the present invention.
Figure 3:
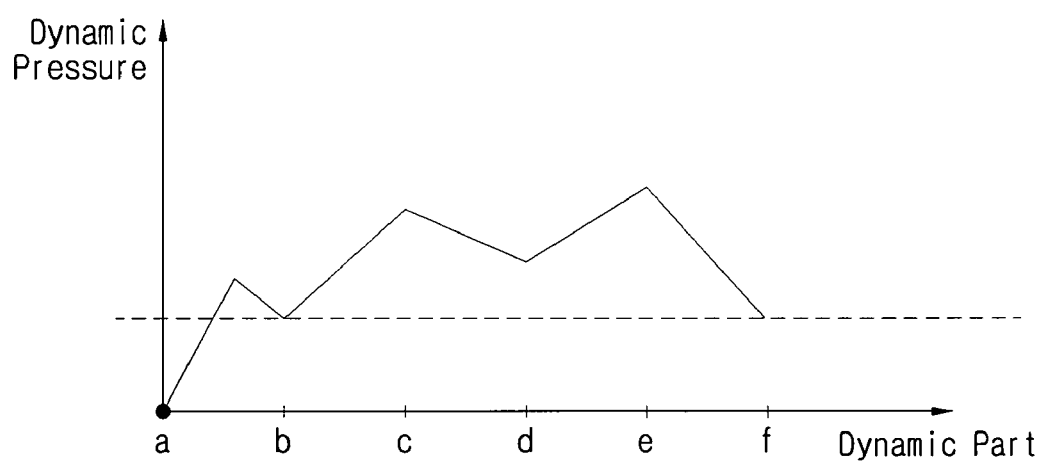
FIG. 3 is a graph showing the extent of a dynamic pressure according to the dynamic part according to the first embodiment of the present invention.

The FIG. 2 is a cross-sectional view showing the flow of the fluid of the fluid dynamic bearing motor according to the first embodiment of the present invention. FIG. 3 is a graph showing the extent of the dynamic according to the dynamic part according to the first embodiment. Referring to FIGS. 2 and 3, (a)~(f) is the location of the dynamic part, sleeve 12, contact part 122, hub 14, inner perimeter 141, stopper 16, storing part 18, fluid 19 are illustrated.

Hub 14 rotates while the electric current is applied to coil 13. At this time, the fluid is injected between contact part 122 of sleeve 12 and inner perimeter 141 of the hub 14. A groove (not illustrated) is formed at inner perimeter 141 of contact part 122 or hub 14. Therefore, the fluid dynamic is generated by the rotation of hub 14. The groove may be formed so that the fluid circulates to the arrow direction of FIG. 2. And the form of the groove is various such as herring bone or spiral type.

Explaining the extent of the dynamic part and the location of the dynamic part while rotating of hub 14. firstly, the (a) of the FIG. 2 does not create dynamic pressure because the a of the FIG. 2 is the store part 18 and opened to the outside although the hub 14 rotates, but the partial fluid acts pressure to the (b) by the centrifugal force.

The (b) spot is spatially seperated from (a) spot because the gap of contact part 141 of hub 14 is blocked tightly with stopper 16 by the oil film. Therefore, the (b) spot maintains the high dynamic pressure. This is because the centrifugal force works at the (a) spot and a groove is formed on the route of (a) and (b) in stopper 16 or hub 14. In the meantime, the dynamic pressure of the (b) spot more rises by work of rotating of the fluid.

With this kind of mode, the dynamic pressure of the (c) spot to the (f) spot t is higher than the (a) spot. This is because the dynamic part of the (a) spot to the (f) spot is shut tightly from the outside. In the meantime, the (g) spot is formed a dynamic pressure because it was also shut tightly from the out side. In the meantime, it is preferable that the groove is formed to the arrow direction of FIG. 2 in order to smoothly circulate.

In this kind of system, the centrifugal force strongly works, and the dynamic pressure formed at the groove is increasing. Sleeve 12 supports hub 14 with stable, because the spots (from the (a) spot to the (f) spot) where the dynamic pressure must be formed is higher that the (a) spot.

Figure 4:
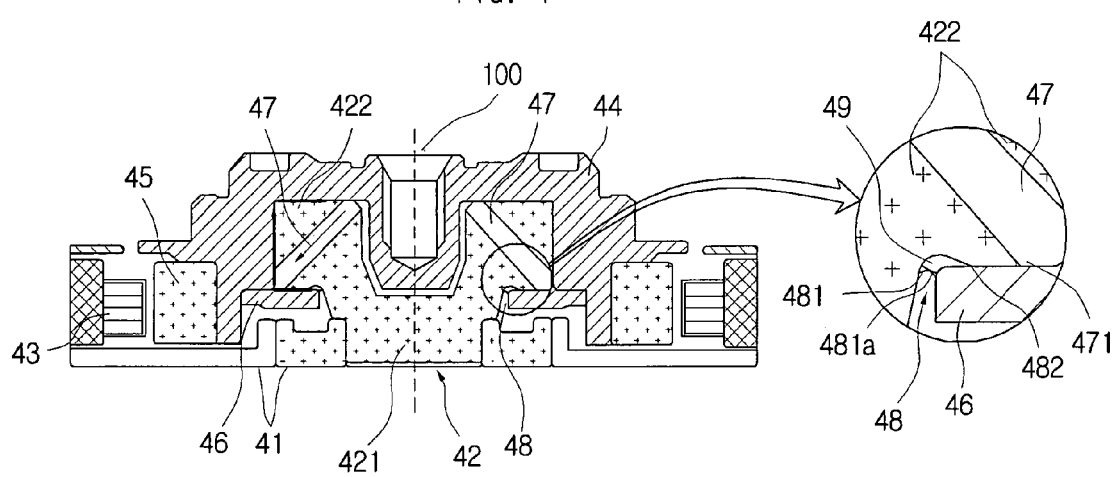
FIG. 4 is a cross-sectional view of a fluid dynamic bearing motor according to the second embodiment of the present invention.

FIG. 4 is a cross-sectional view of the fluid dynamic bearing motor according to the e second embodiment. Referring to FIG. 4, housing 41, sleeve 42, protruded part 421, contact part 422, coil 43, hub 44, hub inner perimeter 441, magnet 45, stopper 46, penetration hole 47, hole exit 471, storing part 48, fluid inlet 482, fluid 49, rotation axis 100 are illustrated.

FIG. 4 shows that stopper 46 is formed by punching the center of circular flat board. That is possible because storing part 48 filled with fluid 49 is formed to the vertical direction from the rotation axis 100. A part of contact part 422 of sleeve 42 or stopper 46 must be removed to form storing part 48. As shown in the enlarged sectional view in the embodiment of FIG. 4, Storing part 48 filled with fluid 49 is formed by removing a part of contact part 422. The gap is perpendicular from the rotation axis 100 toward longitudinal direction. In the meantime, fluid inlet 48 should not be spatially connected with hole exit 471. The space which can store enough fluid 49 is attained by taking the form of this kind of storing part 48. Stopper 46 is not always protruded form in direction of housing 41.

Although fluid interface 481 a is inclined while hub 44 rotates, stopper 46 prevents outward flowing of fluid 49 like the enlarged sectional view of FIG. 4. Furthermore, the form of this storing part 48 increases the dynamic pressure by directing the pressure of fluid 49 to hole exit 471 while hub 44 rotates.

The form of the housing can be changed as the vertical length of stopper 46 is shortened. And the whole thickness of the bearing is shortened like the embodiment of FIG. 1. Moreover, it is not necessary to incline the form of storing part 48, consequently the diameter of the protruded part 421 of the sleeve 42 is attained, and the coherence with the housing 42 increases at the same time.

Figure 5A:
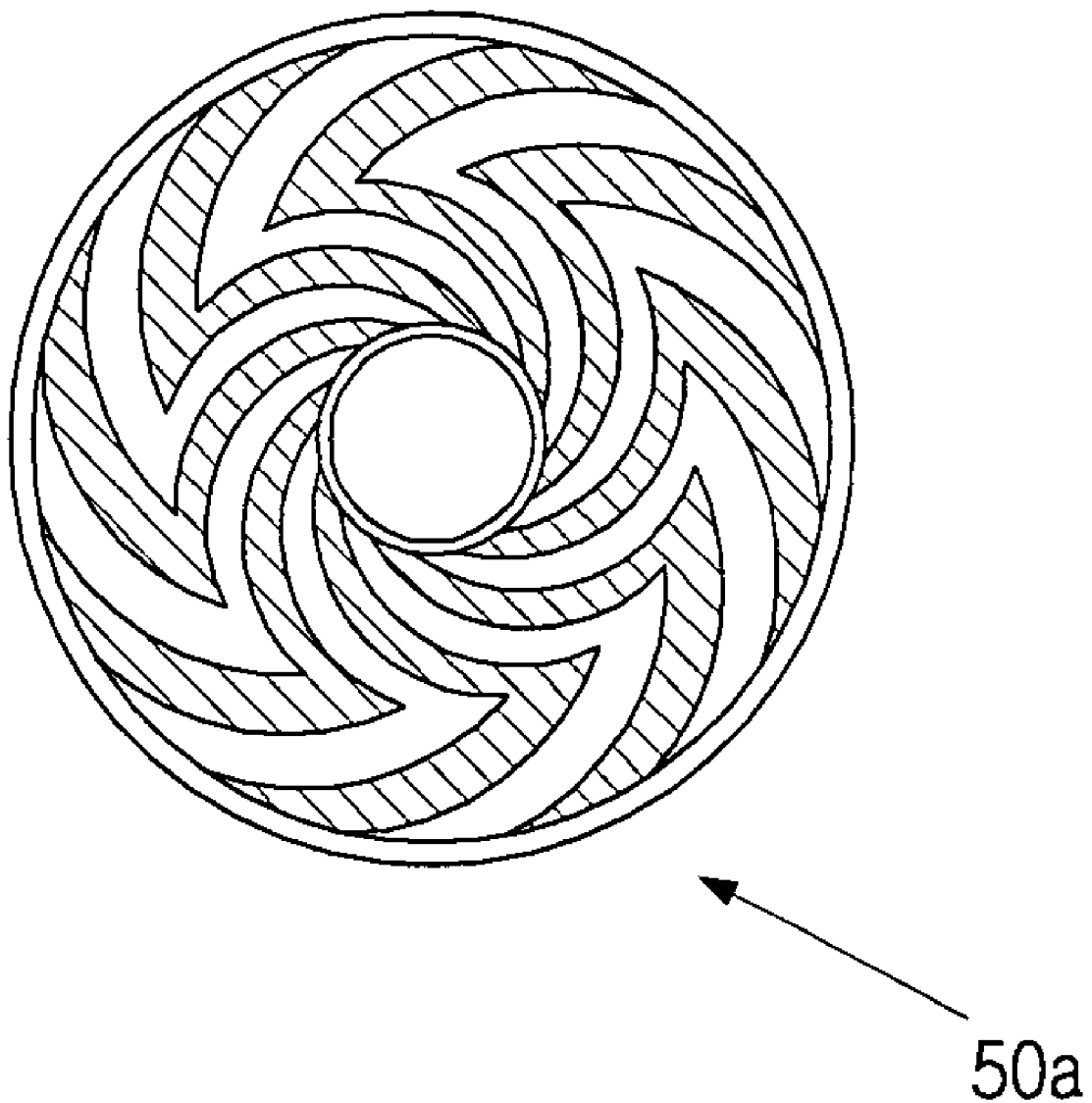
FIG. 5a is a herring bone shaped groove according to the third embodiment of the present invention.
Figure 5B:
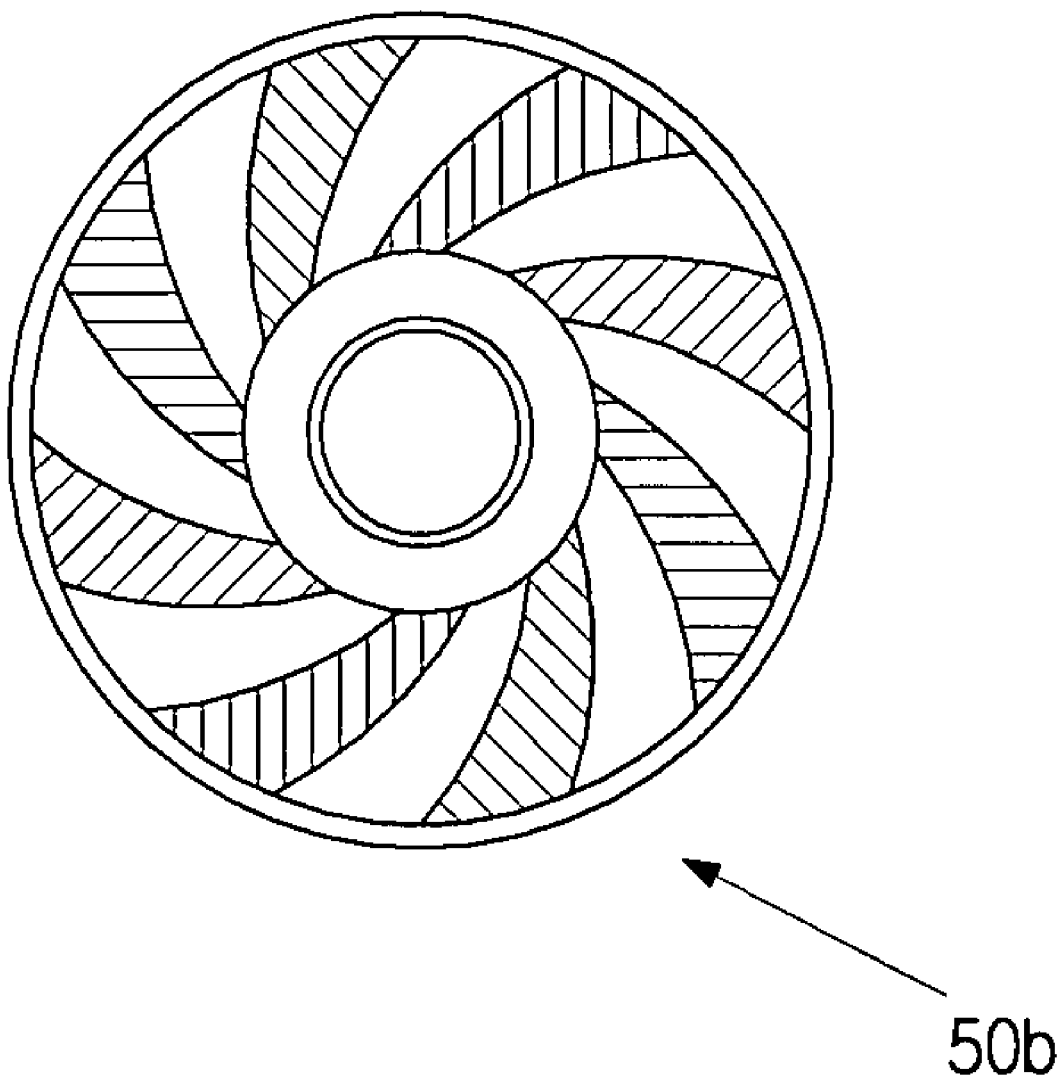
FIG. 5b is a spiral shaped groove according to the fourth embodiment of the present invention.

FIG. 5a herring bone shaped groove according to the third embodiment of the present invention. FIG. 5b is a spiral shaped groove according to the fourth embodiment.

It is preferable that grooves (50a, 50b), FIGS. 5b and 5a may be formed in the contact surface of stoppers (16, 46) or hubs (14, 44) of the first and the second embodiment. FIG. 5a is a herring bone shaped groove, and the FIG. 5b is a spiral shaped groove. The grooves (50a, 50b) may be formed to pump the oil toward the direction of the centrifugal force. This kind of the pumping direction increases the dynamic pressure of the whole bearing. In order to determine the pumping direction of the oil, the grooves (50a, 50b) must be formed according to the rotational direction of hubs (14, 44).

The grooves (50a, 50b) can have various forms including the herring bone shaped of the FIG. 5a and the spiral shaped of the FIG. 5b.

In the meantime, another groove can be formed at the part (like one side of the contact part of the hubs (14, 44) and sleeves (12, 42) generating the dynamic pressure As described in the above, the penetration hole of the fluid dynamic motor according to the preferred embodiment is formed on the space separated from the storing part, and this increases the dynamic pressure of the fluid dynamic bearing motor. The retention of the fluid gets better by changing the forming location of the storing part. In addition, the deformation of a stopper is possible and it reduces the size of the whole fluid dynamic bearing motor.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope

What is claimed is:

1. A fluid dynamic bearing motor comprising:
   a ring-shaped housing having a coil joined to an edge thereof;
   a sleeve including a protruded part joined to a central part of the housing and a ring-shaped contact part formed as a single body with the protruded part;
   a ring-shaped hub having an inner perimeter joined to the contact part and having a magnet attached to an edge thereof, the magnet facing the coil;
   a stopper positioned between the housing and the contact part and joined to the hub such that the sleeve is not detached from the hub;
   a storing part formed as a space between the stopper and the sleeve and filled with fluid, for supplying and maintaining the fluid in a gap formed between the contact part and the inner perimeter of the hub; and
   a penetration hole formed from a center of the sleeve to an edge of the sleeve, the penetration hole being spatially separated from the storing part, and
   an end part of the penetration hole near the edge of the sleeve not being connected to the storing part.

2. The fluid dynamic bearing motor of claim 1, wherein the longitudinal direction of the storing part is formed perpendicularly to a rotation axis of the hub.

3. The fluid dynamic bearing motor of claim 1, wherein the stopper is a circular flat board having a central part perforated.

4. The fluid dynamic bearing motor of claim 1, wherein a groove is formed in the inner perimeter of the hub or in the contact part.

5. The fluid dynamic bearing motor of claim 1, wherein a groove is formed in the inner perimeter of the hub or in the stopper in correspondence to the inner perimeter of the hub such that the groove induces the dynamic pressure of the fluid and pumps the fluid to the direction of centrifugal force.

* * * * *